(12) United States Patent
Gordon et al.

(10) Patent No.: US 8,945,644 B2
(45) Date of Patent: Feb. 3, 2015

(54) PROCESS TO REMOVE IMPURITIES FROM TRIACYLGLYCEROL OIL

(75) Inventors: Roman Gordon, Studio City, CA (US); Igor Gorodnitsky, Marina del Rey, CA (US); Varvara Grichko, Riverside, CA (US)

(73) Assignee: Cavitation Technologies, Inc., Chatsworth, CA (US)

( * ) Notice: Subject to any disclaimer, the term of this patent is extended or adjusted under 35 U.S.C. 154(b) by 1115 days.

(21) Appl. No.: 12/883,328

(22) Filed: Sep. 16, 2010

(65) Prior Publication Data

US 2011/0003370 A1 Jan. 6, 2011

Related U.S. Application Data

(63) Continuation-in-part of application No. 12/484,981, filed on Jun. 15, 2009.

(51) Int. Cl.
| | |
|---|---|
| *A23L 1/025* | (2006.01) |
| *B01F 5/06* | (2006.01) |
| *B01F 13/10* | (2006.01) |
| *B01J 10/00* | (2006.01) |
| *B01J 19/00* | (2006.01) |
| *B01J 19/02* | (2006.01) |
| *B01J 19/24* | (2006.01) |
| *C11B 3/00* | (2006.01) |
| *C11B 3/04* | (2006.01) |
| *C11B 3/16* | (2006.01) |
| *C11C 3/00* | (2006.01) |

(52) U.S. Cl.
CPC ............ *B01F 5/0644* (2013.01); *B01F 5/0646* (2013.01); *B01F 5/0652* (2013.01); *B01F 5/0653* (2013.01); *B01F 5/0682* (2013.01); *B01F 5/0688* (2013.01); *B01F 13/1025* (2013.01); *B01F 13/1027* (2013.01); *B01J 10/002* (2013.01); *B01J 19/0066* (2013.01); *B01J 19/008* (2013.01); *B01J 19/02* (2013.01); *B01J 19/2415* (2013.01); *C11B 3/001* (2013.01); *C11B 3/005* (2013.01); *C11B 3/006* (2013.01); *C11B 3/04* (2013.01); *C11B 3/16* (2013.01); *C11C 3/003* (2013.01); *B01J 2219/0218* (2013.01); *B01J 2219/0231* (2013.01); *B01J 2219/0245* (2013.01)
USPC .......................................................... 426/238

(58) Field of Classification Search
USPC .......................................................... 426/238
See application file for complete search history.

(56) References Cited

U.S. PATENT DOCUMENTS 4,280,962 A * 7/1981 Watanabe et al. ............. 554/192

OTHER PUBLICATIONS

K. J. Moulton & T. L. Mounts, Continuous Ultrasonic Degumming of Crude Soybean Oil, 67 JAOCS 33-38 (1990).*
V. S. Moholkar, Hydrodynamic Cavitation for Sonochemical Effects, 6 Ultrason. Sonochem. 53-65 (1999).*
K. Clausen, Enzymatic Oil-Degumming by a Novel Microbial Phospholipase, 103 Eur. J. Lipid Sci. Technol. 333-340 (2001).*
T. Verleyan et al., Influence of the Vegetable Oil Refining Process on Free and Esterified Sterols, 79 JAOCS 947-953 (2002).*
P. R. Gogate, Cavitational Reactors for Process Intensification of Chemical Processing Applications: A Critical Review, 47 Chem. Eng. Process. 515-527 (2008).*
Suslick, Kenneth S. et al.; Acoustic Cavitation and Its Chemical Consequences; Philosophical Transactions: Mathematical, Physical and Engineering Sciences, vol. 357, No. 1751, Acoustic Cavitation and Sonoluminescence (Feb. 15, 1999), pp. 335-353; The Royal Society.
Gogate, Parag R.; Cavtational reactors for process intensification of chemical processing applications: A critical review; Chemical Engineering Department, Institute of Chemical Technology, University of Mumbai, India, Chemical Engineering and Processing 47 (2008) 515-527; Sep. 23, 2007; ScienceDirect.
Moulton, K.J. et al.; Continuous Ultrasonic Degumming of Crude Soybean Oil; U.S. Department of Agriculture, Agricultural Research Service; pp. 33-38; JAOCS, vol. 67, No. 1; Jan. 1990.
Racicot, L.D. et al.; Degumming of Soybean Oil; Quantitative Analysis of Phospholipids in Crude and Degummed Oil; Department of Food Science and Technology, University of Nebraska: pp. 1098-1101; JAOCS, vol. 60, No. 6 (Jun. 1983).

* cited by examiner

*Primary Examiner* — Randy Boyer
(74) *Attorney, Agent, or Firm* — Kelly & Kelley, LLP

(57) ABSTRACT

The present invention is directed to a process to remove impurities from triacylglycerol oil including mixing the oil and a fluidic agent, pumping the mixture through a flow-through hydrodynamic cavitation apparatus at a pre-determined inlet pump pressure, creating hydrodynamic cavitation in the mixture, maintaining the hydrodynamic cavitation for a pre-determined period of time, moving the impurities from the oil to the fluidic agent, and then separating the fluidic agent from the oil. The impurities can include phytosterols, sterol glucosides, acylated sterol glucosides, in which case the fluidic agent is water, an alkali hydroxide, an inorganic base, an organic base, phosphoric acid, citric acid, acetic acid or a mixture thereof. The impurities may also include phosphatides, in which case and the fluidic agent comprises water and an enzyme such as phospholipase, a lipid acyltransferase or a mixture thereof.

37 Claims, 4 Drawing Sheets

PROCESS TO REMOVE IMPURITIES FROM TRIACYLGLYCEROL OIL

BACKGROUND OF THE INVENTION

The invention generally relates to methods of triacylglycerol oil refining and is based on using flow-through hydrodynamic cavitation. The invention utilizes energy released upon the implosion of cavitation bubbles to purify oils and improve the commercial value of collected by-products. More particularly, the present invention relates to lowering the levels of sterol glucosides (SGs) and acylated sterol glucosides (ASGs) and enzyme-hydrolyzable phospholipids which can be followed by biodiesel production through transesterification. The residual concentrates obtained from the invention can be used as blood cholesterol lowering food additives, in pharmaceuticals' production or for other purposes. The invention finds application in biofuel, chemical, food, pharmaceutical and other industries.

Crude vegetable oils are comprised mostly of triacylglycerols (TAG) and contain impurities such as phospholipids (phosphatides), free fatty acids (FFA), off-flavor compounds, carotenes, chlorophyll and other pigments, waxes, aluminum, calcium, copper, iron, magnesium and other metals and phytosterols. The impurities negatively affect the quality of oil and oil-derived products and must be removed before use.

The crude oil can be produced by solvent extraction or by pressing seeds either with heating or without it. The hot pressing affords the better yield but results in oil deterioration and the accumulation of non-hydratable phosphatides (NHP), for example calcium and magnesium salts of phosphatidic acid (PA) and phosphatidyl ethanolamine (PE) due to the action of enzymes that are active at 57-85° C. PE can be hydrated if it has a net charge. PA has a glycerol backbone usually with a saturated fatty acid, an unsaturated acid, and a phosphate group attached to carbon 1, 2 and 3, correspondingly. To assure a high quality of oil, oil producers avoid exposing seed to temperatures around 55° C.-80° C. and treat them with steam at approximately 150° C. to deactivate phospholipases and lower PA salt level by 25-50% (Cmolik and Pokorny, 2000; Gunstone et al., 2007).

Oil refining methods depend on the type of oil and usually comprises degumming, bleaching and deodorization. Degumming is the removal of phosphorus present in the form of hydratable and non-hydratable phosphatides. Water degumming provides refined oil with a phosphorus concentration greater than 200 ppm and can be followed by alkali refining, bleaching and deodorizing or by acid degumming, dry degumming and physical refining or by enzymatic degumming (Clausen, 2001), bleaching and physical refining. There are numerous variations of oil refining methods, depending on the quality of oil and other conditions. In addition, oil can be hydrogenated to afford a stable product.

Each refining step results in some loss of oil. (Racicot and Handel, 1982; Cvengros, 1995; Cmolik and Pokorny, 2000) The oil yield can be increased by using enzymes instead of chemical reagents. For example, phospholipase C hydrolyzes phosphatidylcholine (PC), liberating the water-soluble phosphate ester of choline and diacylglycerol (DAG). The conversion of phospholipids to DAG increases the oil yield due to the accumulation of DAG in the oil phase and minimal entrapment of neutral oil in gums comprised of hydrated lecithin. PC is converted by phospholipases A1 and A2 to lysophosphatidylcholine and FFA. Lipid acyltransferase (LAT) catalyzes PC breakdown to lysophosphatidylcholine and FFA, which can form esters with the free sterols present in oil. Accordingly, PE is converted by phospholipases A1 and A2 and LAT to lysophosphatidylethanolamine (LPE) and FFA or steryl esters. LPE is a plant growth regulator that can be isolated as a valuable by-product. Phospholipase C catalyses the hydrolysis of PE to ethanolamine-phosphate and DAG. Phosphatidylinositol (PI) can be hydrated over a wide pH range and is converted by phospholipases A1 and A2 and LAT to lysophosphatidylinositol. However, PI is not hydrolyzed by phospholipase C. Phospholipases A1 and A2 and LAT convert alkali salts of PA to lysophosphatidic acid salts. Alkali salts of PA are not affected by phospholipase C.

Since phospholipases A1 and A2 and LAT are soluble in water, they act on the phosphatides located at the oil/water interface. As a consequence, the enzymatic degumming requires long-duration, high-shear agitation to sustain the large oil/water surface area and high mass transfer rates and slows down with the coalescence of water-in-oil dispersion. Oil producers do not use emulsifiers for the stabilization of dispersions on an industrial scale because of their high cost.

SGs are sterol derivatives, in which a carbohydrate unit (arabinose, glucose, etc.) is linked to the hydroxyl group of campesterol, brassicasterol, dihydrositosterol, sitosterol, stigmasterol or other sterols with an ether bond. In ASGs, which are very soluble in vegetable oils, the carbohydrate 6-carbon is esterified with a long chain fatty acid. Phytosterols are abundant in plants and can be readily isolated. (Sugawara and Miyazawa, 1999) They are cellular stress mediators and possess anticancer properties. SGs were reported to exhibit a neurotoxic effect and are a potential causal factor in the motor neuron pathology previously associated with cycad consumption and amyotrophic lateral sclerosis-parkinsonism dementia complex. (Khabazian et al., 2002; Ly et al., 2006; Bradford and Awad, 2007; Tabata et al., 2008) SGs are not soluble in biodiesel or diesel and, therefore, cannot be forced through a diesel engine filter, resulting in a clogged fuel system. SG crystallizes at about 35 ppm at room temperature leading to the formation of haze in biodiesel. SGs and ASGs melt at approximately 240 and 250-300° C. and promote the crystallization of other compounds present in biodiesel at cold temperatures by becoming the seed crystals for large agglomerates. Thus, it is necessary to lower the ASG and SG content of oil feedstock prior to the production of biodiesel.

The level of ASG and SG in biodiesel drops as a result of biodiesel storage due to the sedimentation of agglomerates. ASG can be converted to SG during the base-catalyzed transesterification, for example in alkali-catalyzed methanolysis. (Lepage, 1964) The acid hydrolysis of both SG and ASG liberates the corresponding free sterols, which are not soluble in biodiesel. LAT catalyzes conversion of free sterols to steryl esters.

Crude palm, soybean, corn and sunflower oil scan contain up to 2,500, 2,300, 500 and 300 ppm SGs, respectively. The SG content of palm and soybean biodiesel is 55-275 and 0-158 ppm, correspondingly. (Van Hoed et al., 2008) To evaluate biodiesel contamination level and filterability, ASTM D2068-08 "Standard Test Method for Determining Filter Blocking Tendency" and ASTM D6751-09a "Standard Specification for Biodiesel Fuel Blend Stock (B100) for Middle Distillate Fuels" are used. The Filter Blocking Tendency (FBT) value of soybean biodiesel with ~70 ppm SG is approximately fifteen. The value for FBT of diatomaceous earth-filtered biodiesel with ~20 ppm SG is close to one. The sticky residue retained with filters at palm or soybean biodiesel plants contains up to 50 and 25% of SG and ASG, correspondingly. SGs exhibit high adsorption capacity towards fatty acid methyl esters which results in their entrapment. (Van Hoed et al., 2008)

The purification of oil prior to biodiesel production lowers both phosphorus and phytosterol concentration in the final product. Although SGs can be removed by using filtration, absorption or distillation (Manjula and Subramanian, 2006; Bondioli et al., 2008), biodiesel manufacturers are especially interested in the development of a cost-effective, high-throughput method that lowers the levels of phosphorus, SGs and ASGs in oil feedstock and allows the recovery of valuable residual concentrates.

Most vegetable oils can be purified in the accordance with the present invention including acai, almond, arachis, avocado, buckthorn, camelina, candlenut, canola, cashew, castor, citrus, cocoa butter, coconut, corn, cottonseed, evening primrose, grape seed, groundnut, hazelnut, hemp, jojoba, linseed, macadamia, meadowfoam seed, mongongo, mustard, ojon, olive, palm, papaya, peanut, pecan, pine nut, pistachio, poppyseed, radish, rapeseed, rice bran, safflower, sesame, soybean, sunflower, tung, and walnut oils. The invention is also applicable to algal oil, animal fat, bird fat, fish fat, tallow and grease.

It is known that the increase in both pressure and temperature and the vigorous mixing provided by cavitation can initiate and/or accelerate chemical reactions and processes. Although extreme conditions can be disadvantageous, the outcome of an optimized controlled cavitation treatment is always beneficial. Therefore, the reaction yield enhancement by means of the energy released upon the collapse of generated cavitation bubbles has found a number of applications.

Cavitation can be hydrodynamic, acoustic, ultrasonic, light irradiation-induced, steam injection-generated, etc. Simultaneous application of cavitation-generating methods improves the efficiency (Moulton and Mounts, 1999; Young, 1999; Gogate, 2008; Mahulkar et al., 2008).

If fluid flow is directed in a flow-through hydrodynamic cavitation apparatus at a proper velocity, the vapor-filled bubbles will form within the flow due to the drop in hydrolytic pressure. The bubbles collapse in a slow-velocity, high-pressure zone, causing sharp increases in both pressure and temperature, the formation of high-velocity streams and shock waves, vigorous shearing forces, and the release of a substantial amount of energy. This process activates atoms, molecules, ions and/or radicals located in the bubbles and the surrounding liquid, and initiates chemical reactions and processes. The bubble implosion can also result in the emission of light favoring photoreactions and radical generation.

The cavitation phenomenon is categorized by cavitation number $C_v$, defined as: $C_v=(P-P_v)/0.5\, \rho V^2$, where P is the pressure downstream of a constriction, $P_v$ is the fluid's vapor pressure, $\rho$ is the fluid's density, and V is the fluid's velocity at the orifice. Cavitation starts at $C_v=1$, and $C_v<1$ implies a high degree of cavitation. The number of cavitation events in a flow unit is another important parameter. (Suslick, 1989; Didenko et al., 1999; Suslick et al., 1999; Young, 1999; Gogate, 2008; Passandideh-Fard and Roohi, 2008; Zhang et al., 2008) Numerous flow-through hydrodynamic apparatuses are known. See, for example, U.S. Pat. No. 6,705,396 to Ivannikov et al., U.S. Pat. No. 7,338,551 to Kozyuk and U.S. Pat. No. 7,762,715 to Gordon et al.

With the cost of energy and human health concerns rising rapidly, it is highly desirable to develop a low-cost, environmentally friendly technology for the removal of phospholipids, SGs and ASGs from oils. To achieve as large profit margin as possible, it is necessary to decrease the time, energy consumption and oil loss during refining. The prior art methods do not offer the most efficient technologies for purifying oils in the shortest amount of time possible. As a result, the demand exists for an advanced method for the prompt removal of phytosterols and phospholipids from oil at low energy and agent cost resulting in products with advanced qualities, preferably using the flow-through cavitation. The present invention provides such method while delivering purified oil within a very short processing time. No accumulation of waste material harmful to the environment occurs, and the produced residual concentrates are suitable for downstream processing.

The invention provides an oil purification method based on generating cavitation in an oil flow within at least one cavitation apparatus' chamber, preferably in a number of the consecutively placed chambers. This goal is achieved through the application of cavitation apparatuses aimed at the express purification of oils. In accordance with the present invention, the method comprises feeding a fluidic mixture of oil and agent in the flow-through hydrodynamic cavitation device using a preset inlet pressure sustained by a pump and applying selected conditions and additional agents, if required.

SUMMARY OF THE INVENTION

The present invention is directed to the method of processing TAG oil, fat, tallow and grease with a single- or multi-stage flow-through hydrodynamic cavitation apparatus, including a rotor-stator cavitation apparatus and a high-speed (high-energy) jet collision cavitation apparatus.

Hydrodynamic cavitation significantly lowers the level of impurities in oil, allowing for express, high-efficiency refining. The treatment begins with providing a cavitation apparatus. Next, liquid oil is mixed with an agent (for example, the aqueous solution of sodium hydroxide for ASG and SG removal or the solution of phospholipase A1 for the removal of phosphatides) and the mixture is pumped at a proper pressure in the device's passage wherein flow pressure alternates in the designed mode, and, therefore, cavitation features are created in the mixture. The cavitation temporarily separates the high-boiling constituents of oil from the entrapped gases, water vapor and the vapors of low-boiling compounds that can be found in cavitation bubbles. The implosion of these bubbles thoroughly mixes the oil and water, increasing the contact surface area of the two immiscible liquids. Since ASG and SG are high-boiling compounds, they are likely to play a role as the nuclei of bubbles and, thus, are subjected to the full impact of the implosions. The mixture loses cavitation features in the end chamber of the cavitation apparatus, and the purified oil and impurity-enriched layer are separated via gravitational settling, static decantation, centrifugation, filtration, distillation, freezing, absorption or other procedure or combination thereof. In some cases the purification of oils with the flow-through hydrodynamic cavitation can be carried out by using water with no agent added or be followed by mechanical agitation to complete the enzymatic reactions.

The separated phytosterol-containing residue varies in appearance and volume, depending on the temperature, agent, the initial levels of SG and ASG in the oil, the water-to-oil ratio, the inlet pressure of the cavitation apparatus, the separation procedure and other conditions. With sodium hydroxide, the separation via centrifuging may result in the formation of three layers. Diluted phosphoric, citric and other acids split ether bond liberating free sterols.

The hydrodynamic cavitation-assisted purification of oil from ASG and SG provides vigorous mixing and an extremely large water/oil interface, requires only a relatively small amount of agent and can be easily scaled up to accommodate high throughput. The cavitation-assisted purification can be conducted at ambient temperature or at a temperature below the ambient temperature, which prevents unsaturated fatty acid from deterioration and saves energy. Under optimized cavitation conditions no significant degradation or deactivation of phospholipases or LAT is observed, which guarantees the expected outcome of enzymatic refining.

It is known that the oil content of lecithin produced via conventional methods is very high reaching 35%. To release the TAG oil entrained in the gums and increase the oil yield, the isolated gums can be liquefied by dissolving in water, hexane or other solvents by using increased temperature, suitable reagents and mechanical agitation and processed with the flow-through hydrodynamic cavitation device while applying enzymes acting on phosphatides or proper agents.

The present invention is directed to a process to remove impurities from triacylglycerol oil. The process begins with mixing the oil and a fluidic agent to form a fluidic mixture having an oil phase and a water phase. This fluidic mixture is then pumped through a single- or multi-stage, flow-through hydrodynamic cavitation apparatus. In this apparatus, hydrodynamic cavitation is created in the fluidic mixture by pumping the fluidic mixture at a pre-determined inlet pump pressure. The hydrodynamic cavitation is maintained in the fluidic mixture for a pre-determined period of time. During the hydrodynamic cavitation, the impurities are moved from the oil phase to the water phase. Finally, the water phase containing the impurities is separated from the oil phase.

In this invention, the oil can include oil, fat, tallow or grease derived from a wild type, mutated or genetically altered unicellular or multicellular algae, plant, animal or mixture thereof. The oil may be crude, refined, pressed, extracted, filtrated, or dewatered. In addition, the oil may be liquefied prior to performing the mixing step. The oil may also be a multi-phase blend of immiscible liquids, solutes, acids, bases, salts, or gasses comprising a dispersion, an emulsion, a suspension, a melted solid, a gas in a supercritical condition or a mixture thereof.

The flow-through hydrodynamic cavitation apparatus preferably comprises a high-energy, jet collision hydrodynamic cavitation apparatus or a spinning, rotor-stator hydrodynamic cavitation apparatus.

The fluidic mixture within at least one region inside the hydrodynamic cavitation apparatus has a cavitation number less than or equal to one. Such cavitation number is calculated using the equation: $C_v=(P-P_v)/0.5 \rho V^2$, where $C_v$ is the cavitation number, P is the fluid pressure downstream of a constriction, $P_v$ is the vapor pressure of the fluidic mixture, $\rho$ is the density of the fluidic mixture, and V is the velocity of the fluidic mixture at the constriction.

The separating step may be performed by absorption, centrifugation, decantation, distillation, extraction, filtration, freezing, settling, sedimentation or combination thereof. The maintaining step may comprise the step of repeating the pumping and creating steps one or more times in one or more hydrodynamic cavitation apparatuses.

The mixing step may include diluting the oil with an organic solvent. The process may also include cavitating the oil prior to performing the mixing step. The fluidic mixture may be heated or cooled prior to performing the pumping step. Ammonia gas, nitrogen, carbon dioxide or a mixture thereof may be introduced to the fluidic mixture before or during the pumping, creating and/or maintaining steps. The oil is preferably degassed prior to performing the pumping, creating and/or maintaining steps.

Reagents, oxides, nitrides, ceramics, plastics, polytetrafluoroethylene, nanodiamonds, nanotubes, or combinations thereof may be immobilized onto inner walls of the hydrodynamic cavitation apparatus or onto a removable insert configured for insertion into the hydrodynamic cavitation apparatus. A selective membrane and/or bleaching earth may be placed in an end chamber of the hydrodynamic cavitation apparatus or in a chamber located downstream of the hydrodynamic cavitation apparatus.

The fluidic mixture may be subjected to acoustic cavitation during the inventive process. In addition, the fluidic mixture may be subjected to an external electric and/or magnetic field to enhance hydrodynamic cavitation-assisted purification.

In one particularly preferred embodiment, the impurities comprise phytosterols, sterol glucosides and/or acylated sterol glucosides. In this preferred embodiment, the fluidic agent is water comprising 0.1-10% v/v of the fluidic mixture. The water is preferably distilled, de-ionized, reverse osmosis-purified, soft water or otherwise conditioned. The fluidic agent may also comprise a solution of an alkali hydroxide comprising sodium hydroxide or potassium hydroxide, an inorganic base, an organic base or a mixture thereof. Alternatively, the fluidic agent may comprise a solution of phosphoric acid, citric acid, acetic acid or a mixture thereof.

The separating step, as it relates to phytosterol impurities, may be carried out contemporaneously with the maintaining step. The separating step, as it relates to sterol glucosides, acylated sterol glucosides and/or derivative-enriched concentrates of the same, may comprise the steps of: liquefying the separated sterol glucosides, acylated sterol glucosides and/or derivative-enriched concentrates thereof by preheating and/or treating the same with solvents and/or liquefying agents; adding enzymes or chemical agents to the liquefied sterol glucosides, acylated sterol glucosides and/or derivative-enriched concentrates thereof; subjecting the liquefied sterol glucosides, acylated sterol glucosides and/or derivative-enriched concentrates thereof combined with enzymes or chemical agents to flow-through hydrodynamic cavitation; and releasing entrapped oil in the liquefied sterol glucosides, acylated sterol glucosides and/or derivative-enriched concentrates thereof.

In a second particularly preferred embodiment, the impurities comprise phosphatides and the fluidic agent comprises water and an enzyme. The enzyme may be kosher. In this preferred embodiment, the enzyme may comprise a phospholipase, a lipid acyltransferase or a mixture thereof. The phospholipase may be a wild type, mutated or recombinant bacterial, yeast, plant or animal phospholipase A, phospholipase A1, phospholipase A2, phospholipase B, lysophospholipase, phospholipase C, phospholipase D, phosphodiesterase, lipid acyltransferase, phosphodiesterase or mixture thereof.

The oil may be mixed with water and the mixture is subjected to hydrodynamic cavitation followed by the addition of the enzyme comprising phospholipase, lipid acyltransferase or mixture thereof. The enzyme is preferably immobilized onto a removable cartridge, grid, filter, insert, inner surface, magnet, magnetic particles, metal particles, plastic particles, nanoparticles, nanotubes, nanodiamonds, carbonaceous nanoparticles, particles and/or carriers placed at desired locations within the hydrodynamic cavitation apparatus. The fluidic mixture is preferably heated or cooled to a temperature in the range of 40-60° C. for optimal enzyme activity.

The process may further comprise the steps of: reacting the phosphatides in the fluidic mixture with the enzyme; agitating the fluidic mixture for a pre-determined period of time to allow completion of the phosphatide reaction; and stopping the phosphatide reaction. The phosphatide reaction may be stopped by heating; changing the pH; applying an inhibitor, protease or chelating agent that forms a complex with the enzyme's co-factor; carrying out high-shear mixing; ultrasonic cavitation; and/or subjecting to hydrodynamic cavitation.

The separating step comprises the step of removing the reacted phosphatides. The reacted phosphatides may be removed by absorption, centrifugation, decantation, extraction, filtration, freezing, membrane filtration, or sedimentation. The separating step, as it relates to the removed phosphatides, may further comprise the steps of: liquefying the removed phosphatides by preheating the removed phosphatides, and/or adding solvents and liquefying agents to the removed phosphatides; subjecting the liquefied phosphatides to flow-through hydrodynamic cavitation; and releasing entrapped neutral oils and liberating diacylglycerols and fatty acids in the liquefied phosphatides. Alternatively, the separating step, as it relates to the removed phosphatides, may further comprise the steps of: liquefying the removed phosphatides by preheating the removed phosphatides, and/or adding solvents and liquefying agents to the removed phosphatides; adding releasing agents and/or lipid acyltransferase, lipase, phospholipase or a mixture thereof to the liquefied phosphatides; releasing entrapped oils in the liquefied phosphatides.

The present invention is also directed to a method of generating cavitation in a flow mixture of oil and agent resulting in the production of oil refined of ASG, SG and phosphorus. This goal is achieved through the design of the cavitation apparatuses aimed to expedite purification followed by separating the impurity-enriched residue from oil. In accordance with the present invention, the method comprises feeding liquid oil and agent solution or a mixture thereof into the flow-through hydrodynamic single- or multi-stage cavitation apparatus with a pump and controlling cavitation by varying the inlet pump pressure, and continuing the application of such treatment for a period of time sufficient to obtain the refined oil. The term oil includes, but is not limited to homogeneous or heterogeneous triacylglycerol oil, fat, tallow and grease existing in a liquid phase prior to cavitation, produced by wild type, mutated or genetically engineered bacteria, yeast, algae, plant(s), animals, bird, fish and other prokaryotes or eukaryotes, a two-phase or a multi-phase system comprised of oil, water and/or other immiscible liquids, solution of salts, acids, bases, enzymes, gases and/or other solutes, dispersions, emulsions, suspensions, melted solids, gases in a supercritical state and mixtures thereof. The fluid may be heated, cooled, degassed or saturated with nitrogen, carbon dioxide and other gas or mixtures thereof.

Accordingly, besides the objects and advantages of the expeditious oil purification described herein, several objects and advantages of the present invention are:

(1) Provide a method for obtaining refined TAG oil suitable for human consumption and the production of haze-free biodiesel of ASTM quality;
(2) Provide a method for removal of ASG and SG from oil in a dramatically expedited and simplified manner without employing elevated temperature and pressure associated with the conventional methods;
(3) Provide a method for improving the oil yield by subjecting oil and phospholipase or lipid acyltransferase solution to hydrodynamic cavitation followed by subjecting the separated residue (the swollen oil-insoluble gels formed by hydrated phospholipids that precipitate from the oil) to a subsequent cavitation treatment;
(4) Provide a method, wherein two or more cavitation apparatuses are employed to afford high throughput production.

The objects of the present invention are achieved by feeding a mixture of oil and agent into a hydrodynamic cavitation apparatus to carry out the conversion of impurities and the extraction of the corresponding products with a water phase. Hydrodynamic cavitation involves the formation of vapor bubbles of volatile compounds within the mixture's flow accelerated to a proper velocity with a pump. The phenomenon is called cavitation, because cavities form when the flow pressure is reduced to the vapor pressure of volatile compounds in the fluid. The bubbles expand and collapse, reaching a region of higher pressure. The implosion causes a localized increase in the pressure and temperature and intense shearing forces, resulting in thorough mixing and the acceleration of reaction rates.

It is an equipment cost decision what type of a flow-through hydrodynamic cavitation apparatus to employ since a number of configurations are feasible, whether for large-scale or small-scale refining. One approach for the best outcome is to create intense cavitation evenly throughout the flow, avoiding wasting energy. Ideally, the energy applied should be optimized when cavitation still efficiently occurs and energy expenditure is minimal. Other objects and advantages of the present invention will become apparent from the following detailed description, when viewed in conjunction with the accompanying drawings, which set the embodiments of the present invention.

BRIEF DESCRIPTION OF THE DRAWINGS

The accompanying drawings illustrate the invention. In such drawings.

DETAILED DESCRIPTION OF THE PREFERRED EMBODIMENTS

With reference to the attached figures, a method for the creation of cavitation in an oil-water flow resulting in localized spots of increased pressure, heat and vigorous mixing to refine oil is disclosed. The method uses a flow-through hydrodynamic cavitation apparatus to carry out ASG, SG and/or phospholipid removal from oil. The intense local heat released due to the vapor compression and the formation of micro jets, which accompany the bubble implosion, activate molecules contained in adjacent layers of surrounding fluid and improve mass transfer, thereby promoting the target reactions and driving modified impurities to the water phase.

A preferred flow-through cavitation apparatus should be fabricated of inert material, for example stainless steel. To enhance its resistance to corrosive agents, the inner surface can be coated with oxides, nitrides, ceramics, plastics, polytetrafluoroethylene (PTFE), nanodiamonds, nanotubes, and other suitable compounds, materials, composites, particles, nanoparticles and combination thereof. The apparatus can be optimized via hardening, anodizing and other technologies. In another embodiment, agents are immobilized onto the inserts and/or device's inner surface or are supported by magnet, magnetic or other particles attached at a desired location. The cavitation apparatus can be provided with a filter, selective membrane or absorbant to afford even better removal of impurities.

Figure 1:
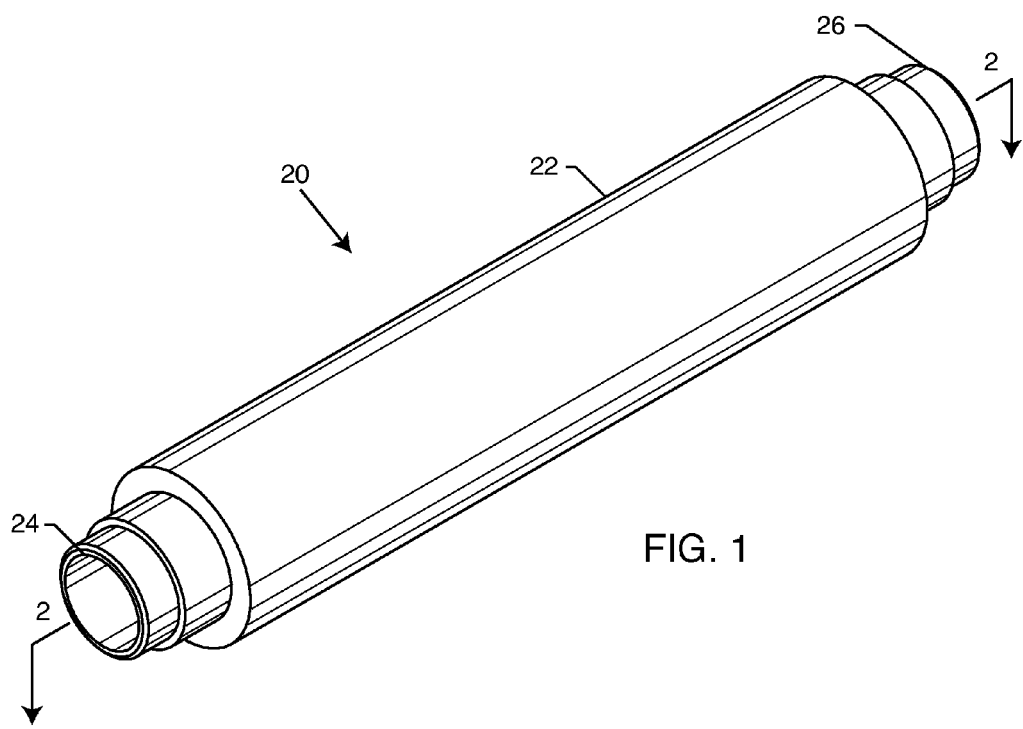
FIG. 1 is a perspective view a preferred embodiment of the present multi-stage cavitation device.
Figure 2:
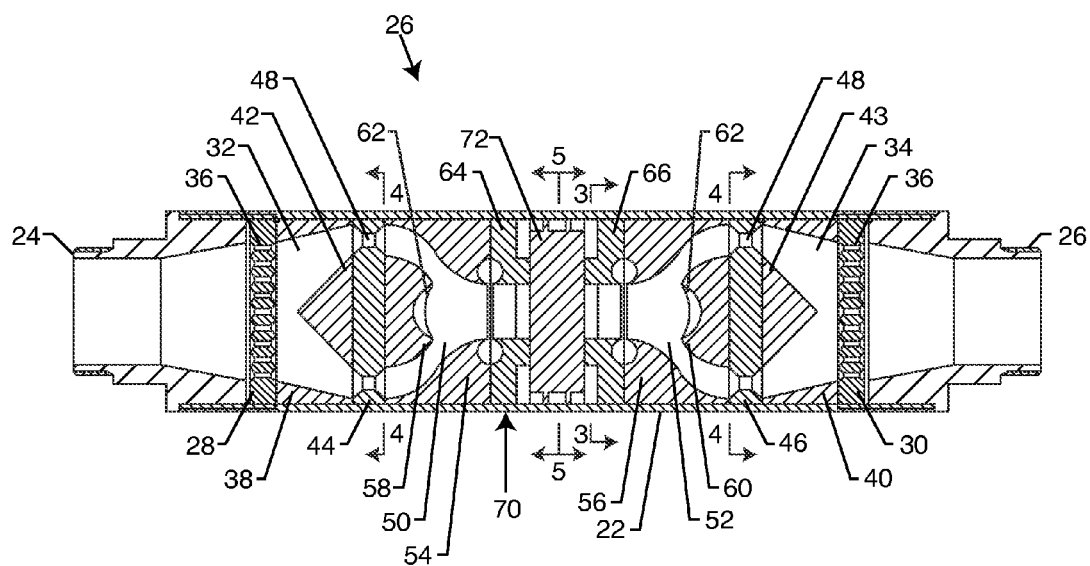
FIG. 2 is a cross-sectional view taken along line 2-2 of FIG. 1.

The flow-through cavitation device depicted in FIGS. 1 and 2 is comprised of a steel housing 22, which is attached to inlet 24 and outlet 26 pipes for direct connection to an industrial pipeline (not shown). The device 20 preferably has a mirrored symmetry such that from the inlet 24 to a mid-point 27 is repeated in reverse from the mid-point 27 to an outlet 26. The following description will follow the mirrored symmetry and describe from both the inlet 24 and outlet 26 toward the mid-point 27 simultaneously.

Assuming flow from left to right, front and end disk multi-jet nozzles 28, 30 serve as the front and back walls of exterior working chambers 32, 34 and are located behind the inlet pipe 24 and in front of the outlet pipe 26. The multi-jet nozzles 28, 30 are equipped with constricting and expanding channels 36 that are distributed uniformly over the surfaces of the disks that are the multi-jet nozzles 28, 30. The working chambers 32, 34 are comprised of radial cones 38, 44 and central guide cones 42, 43, which are attached to radial multi-jet nozzles 44, 46. The radial multi-jet nozzles 44, 46 feature both constricting and expanding channels 48. The channels 48 are spread evenly over the radial perimeter surface of the nozzles 44, 46, which direct the flow to interior working chambers 50, 52.

Flow guides 54, 56 that direct the flowpath from the perimeter to a center of the device 20 bound the chambers 50, 52. The cross-section of the flow guides 54, 56 generally has a S-shape configuration. A hemi-spherical body 58, 60 with a top niche 62 is mounted in the working chambers 50, 52 against the multi-jet nozzle 44, 46. The turbulizer disk 64, 66 (FIG. 3) with curved guides 68 and central hole 69 is located behind the guides 54, 56 in vortex chamber 70. The vortex chamber 70 is formed of the inner wall of the housing 22 and a cylindrical body disposed in the center. The vortex chamber 70 directs the flow from the hole 69 of the front disk 64. The holes 69 in the disks 64, 66 are coaxial. Their diameters are equal to that of holes in the guides 54, 56. The mid-point 27 is within the vortex chamber 70.

Figure 3:
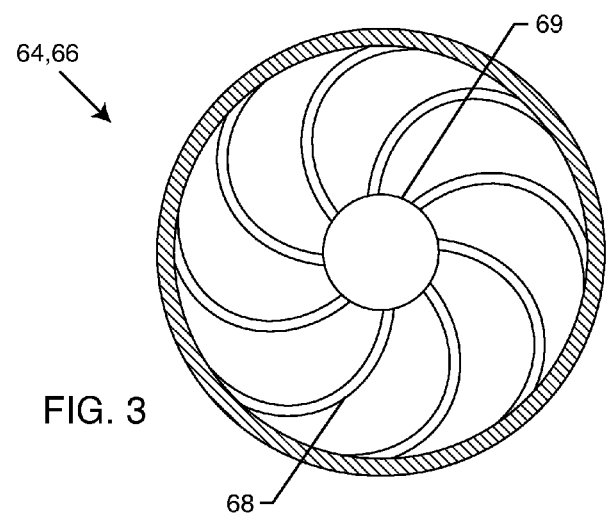
FIG. 3 is a cross-sectional view of the turbulizer disk taken along line 3-3 of FIG. 2.
Figure 4:
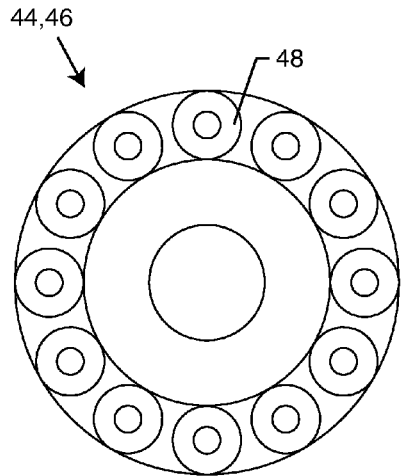
FIG. 4 is a cross-sectional view of the radial multi-jet nozzle taken along lines 4-4 of FIG. 2.
Figure 5:
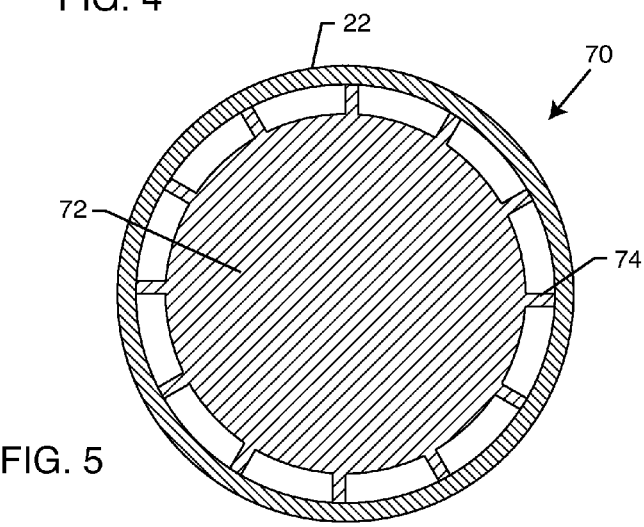
FIG. 5 is a cross-sectional view of the cylindrical body taken along lines 5-5 of FIG. 2.
Figure 6:
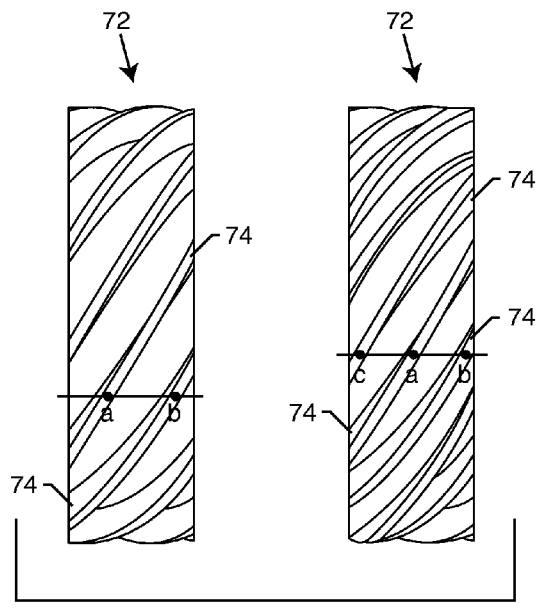
FIG. 6 is a side view of the cylindrical body.
Figure 7:
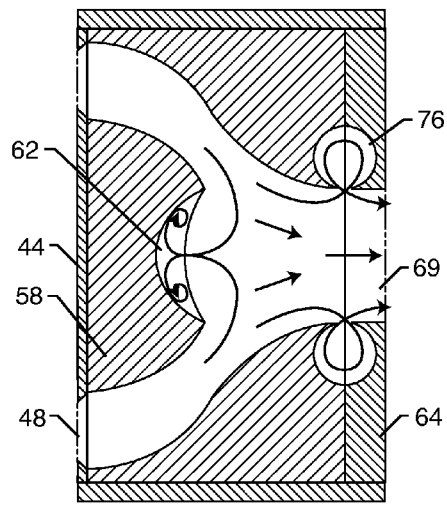
FIG. 7 is a close-up view of the front interior working chamber and toroidal vortex chamber illustrating fluid flow.
Figure 8:
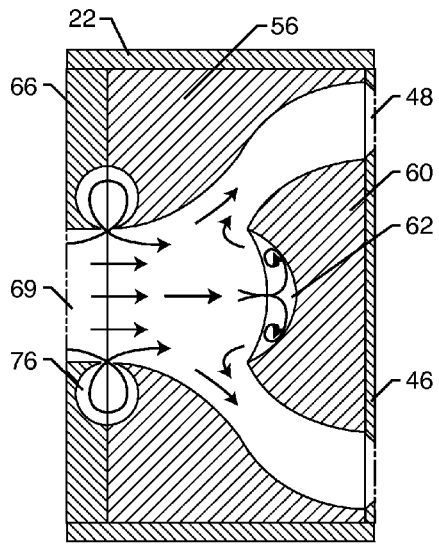
FIG. 8 is a close-up view of the back interior working chamber and toroidal vortex chamber illustrating fluid flow.
Figure 9:
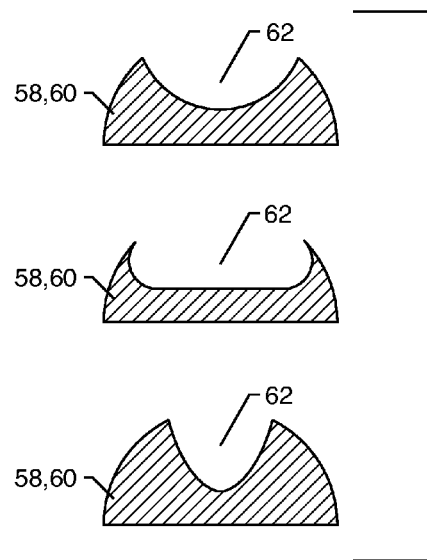
FIG. 9 is a cross-sectional view of various forms of the hemi-spherical body.

FIG. 3 is a diagram that shows disks 64, 66 with curved guides 68 and central holes 69. An interior side of the radial multi-jet nozzles 44, 46 is depicted in FIG. 4. The channels 48 let out into the working chambers 50, 52 housing the hemispherical body 58, 60 with the top niche 62. FIG. 5 shows a cross-sectional view of the cylindrical body 72, which is provided with the superficial perimeter guides 74 that serve as the channels for fluid flow. FIG. 6 is a drawing of a preferred embodiment for the guides 74 of the cylindrical body 72. FIGS. 7 and 8 depict the junction between the working chambers 50, 52 and the disks 64, 66 and illustrate fluid flow. At the junction between the guides 54, 56 and the disks 64, 66 are toroidal vortex chambers 76 which are connected to the holes 69 and working chambers 50, 52. FIG. 9 is a simplified schematic illustration showing various embodiments for the niche 62: a hemi-sphere, a toroid, and a parabola.

The present flow-through cavitation device (FIG. 2) operates as follows. Fluid, for example, a rough disperse emulsion, is pumped in the inlet pipe 24. The fluid moves to the multi-jet nozzle 28 and passes through its channels 36, which have both constrictions and expansions. Flowing through the channels 36 causes the formation of vortices, detached flows and cavitation. Particles of the emulsion become subjected to shear forces, and emulsion quality improves. When cavitation bubbles reach the working chamber 32 they pulsate and collapse. The bubble implosion results in increased pressure and temperature and formation of local jets that act on the emulsion particles, further improving the emulsion homogeny. Then the flow moves in a converging cone formed by the radial cone 38 and the central cone 42 that is mounted on the radial multi-jet nozzle 44. The flow is accelerated as it passes through the converging cone and then enters the channels 48, which possess both constrictions and expansions to generate vortices, detached flows and cavitation in the fluid flow.

After passing through the radial multi-jet nozzle 44, the flow moves into the interior working chamber 50 where the cavitation bubbles pulsate and implode. When fluid flow moves down along the surface of the semi-spherical body 58 it falls off the sharp edges of the top niche 62 generating toroidal vortices and a cavitation zone within the end of the working chamber 50. This cavitation field is characterized by a high intensity and a large cavity concentration. The end of the flow guide 54 is shaped as a constricting nozzle. The hole 69 in the disk 64 is shaped as an expanding nozzle in the beginning and a toroidal resonator 76 is positioned in the constrict location.

When the fluid flows along the place of the attachment of the flow guide 54 to the disk 64 it enters the ring grooves or toroidal resonator 76. The working principle of the toroidal resonator 76 is based on a high sensitivity of an symmetric flow to a side pressure. Changing pressure at the jet origination point will result in angular alteration of the fluid flow. The fluid is forced off the toroidal resonator 76 by discrete portions, which generates dynamic pulsations, vortices and cavitation. The frequency of a toroidal resonator depends on its diameter (Agranat et al., 1987).

The flow moves out of the working chamber 50, accelerating due to passing through the hole 69 in the front disk 64 and then enters channels located between the guides 68 on the front disk 64 in the vortex chamber 70. To maintain the fluid flow in a vortex state and to prevent it from moving in a plane parallel to the cavitator central axis, the guides 74 are provided on the cylinder 72 surface to direct the flow into channels 78 and sustain the spiral flow state (FIG. 5). In the vortex chamber 70, cavitation bubbles are acted upon by centrifugal and Coriolis forces. As a result, the fluidic pressure rises and the bubbles collapse.

The direction of the flow moving down the channels 78 formed by the guides 74 provided on the cylinder 72 surface is determined by the pitch angle with respect to the central axis of the cavitation device 20. In order to prevent flow from following the straight path, certain requirements must be met. Lines that are parallel to the main axis and go through any point on the surface of a guide 74 should intersect the adjacent guide. In FIG. 6, a straight line parallel to the central axis, goes through point a on the guide 74 and intersects the adjacent guide 74 at point b. The more guides that are intersected by a straight line (points c, a and b), the better the flow is twirled in the vortex chamber 70. The number of guides 74 that may be intersected by one line is limited due to the requirement that the total area of the guide channels 78 be equal to the area of the central hole 69 of the disks 64, 66. The total cross-sectional area of the channels 78 can be calculated by multiplying the number of channels by the height and width.

After passing through the channels 78 the fluid flow moves over the surface of the vortex guides 68 and enters the hole 69 in the rear disk 66. This directs the flow along the central axis of the device 20. When the fluid flow passes the rear disk 66 and rear guide 56 it enters the rear toroidal resonator 76, the working principle of which is described above. The accelerated flow falls on the top niche 62 of the rear hemi-spherical body 60, forming pulsating toroidal vortex and cavitations' zone (Dudzinskii and Nazarenko, 1996; Nazarenko, 1998). The pulsation frequency and the cavitation zone shape depend on the fluid properties, flow rate and the niche shape. The preferred embodiments for the niche 62 are described above.

The fluidic flow passes through the region of the toroidal resonator 76 and niche 62 and enters the working chamber 52 bounded by the rear guide 56 inner wall and the rear semi-spherical body 60, which direct the flow from the center to the perimeter. The cavities detached from the toroidal flow region implode in the working chamber 52. After passing the working chamber 52, the fluid flow enters channels 48 of the rear radial multi-jet nozzle 46 provided with the constrictions and the expansions. This generates vortices, detached flow jets and cavitation. When the fluid flow moves in the working chamber 34, the flow velocity decreases, the pressure goes up, and pulsation and implosion of the bubbles take place. Then the flow passes through the constrictions and the expansions 36 of the rear multi-jet nozzle 30 followed by generation of vortices, detached flow jets and cavitation. The particles of emulsion that undergo the cavitation process are reduced in size and their surfaces are modified. The cavitation bubbles pulse and implode within the working chamber 34, leading to shear force and local jet formation. Then the fluid flow exits the cavitation device through the outlet pipe 26.

This preferred embodiment of the device provides at least eleven cavitation zones: (1) the front multi-jet nozzle 28; (2) the front, radial multi-jet nozzle 44; (3) the top niche 62 in the front hemi-spherical body 58; (4) the front toroidal vortex chamber 76; (5) the hole 69 and curved guides 68 of the front disk 64; (6) the vortex chamber 70; (7) the hole 69 and curved guides 68 of the rear disk 66; (8) the rear toroidal vortex chamber 76; (9) the top niche 62 in the rear hemi-spherical body 60; (10) the rear, radial multi-jet nozzle 46; and (11) the rear-end multi-jet nozzle 30. The device design allows for two, four, six or even more mirror-symmetric cavitation regions. The plane of mirror symmetry goes through the mid-point 27 of the vortex chamber 70 located between the disks 64, 66.

One of the numerous advantages of the preferred embodiment is its versatility in respect to fluid feeding. The device 20 can be connected to a pump at either end and is especially suitable for technological applications with a demand for reversing flow direction. The device 20 can be incorporated in a pipeline without any risk of confusing inlet with outlet. The main benefit of the present flow-through cavitation device 10 is the interface of the vortex and cavitation generating zones with the higher-pressure working chambers for the cavitation bubbles' implosion.

Figure 10:
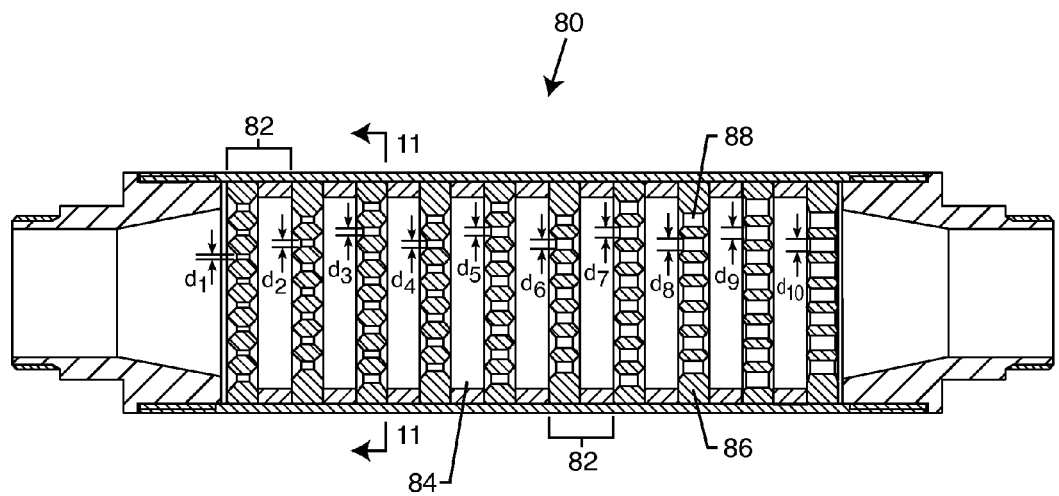
FIG. 10 is a cross-sectional view of another preferred embodiment of the multi-stage flow-through hydrodynamic cavitation device.
Figure 11:
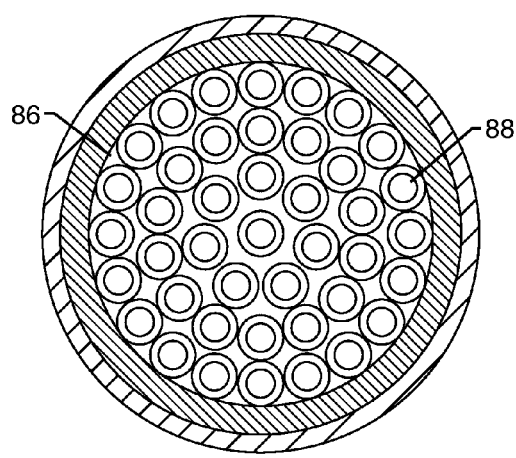
FIG. 11 is a cross-sectional view taken along line 11-11 of FIG. 10.

FIG. 10 is a drawing that shows an alternate embodiment for a flow-through multi-stage cavitation system 80 that provides as many as ten zones 82 for generation and collapse of cavitation bubbles and is comprised of ten identical working chambers 84 and ten multi-jet nozzles 86 that differ in respect to the cross-sectional passage areas created by their channels 88.

When fluid is fed in the cavitation 80 device through a displacement pump or other means, the flow rate is the same within the identical, sequentially located multi-jet nozzle channels 88. Thus, it is possible to lower the fluid flow rate within the channels of nearby downstream multi-jet nozzles, while keeping the cavitation at the same level. When the fluid flow passes through the front multi-jet nozzle 86 and the working chamber 84, the cavities implode and the fluid's temperature rises. The increased temperature and amplification of the nuclei facilitate the onset of cavitation events in downstream cavitation zones. Therefore, the same cavitation number and the same cavitation bubble concentration can be achieved within downstream zones with the lower flow velocity inside the nozzle channels 88.

During multi-stage fluid processing the hydraulic resistance is reduced by meeting the following condition: The cross-sectional channel area ($S_n$) of each multi-jet nozzle is less than that of the next multi-jet nozzle ($S_{n+1}$) following the flowpath, according to the equation: $1.0 \le S_{n+1}/S_n \le 1.1$, where n=1, 2, 3, 4, 5, 6, 7, 8 or 9. This helps save energy required for pumping a fluid flow through the multi-zone cavitation system. To scale back the cavitation device parts, for example, the multi-jet nozzle 86, it is necessary to place the channels 88 for fluid passage as close as possible. The number of the channels 88 of the multi-jet nozzle 86 is limited by the ratio of the total area of the largest cross-sectional openings of the channels ($S_d$) to the surface area of the multi-jet nozzle ($S_D$): $S_d/S_D \le 0.8$, where $$S_d = \sum_{i=1}^{k} S_i$$

(k is the number of channels of the multi-jet nozzle; $S_i = \pi d_i^2/4$, where $d_i$ is the largest diameter of the channels I, and $S_D = \pi D^2/4$, where D is the multi-jet nozzle diameter.

In either embodiment handling a multi-component fluid, the composition of the cavitation bubble vapors is not uniform. The cavities are enriched with the vapors of the compound(s) that are most volatile under the given conditions. The bubble implosion releases energy that drives chemical reactions and/or warms up the fluid. The processed matter contains the products of these reactions, the newly formed chemical compounds. The size of the cavities depends on the nature of the fluid under the treatment, the engineering design of the cavitation device and other conditions, such as the velocity of a flow sustained by a pump. In practice, the pump pressure is increased until a proper intensity of the cavitation field is achieved. In addition to determining the size, concentration and composition of the bubbles, and, as a consequence, the amount of released energy, the inlet pressure governs the outcome of the chemical reactions. The faster the flow moves, the smaller the cavitation number. A lower cavitation number (especially when less than one) implies a high degree of cavitation. The preferred embodiment of the present invention optimizes the cavitation to perform uniform alteration of fluids by applying the most suitable pump pressure. If too much energy is applied or the treatment time is too long, then the processing cost goes up. By applying hydrodynamic cavitation at a pump pressure designed to generate cavitation and chemical conversion evenly throughout the fluid, the change in physical and chemical properties takes place and the desirable outcome is obtained.

The devices depicted in the FIGS. 1-11 are used for carrying into effect the method, according to the present invention. In accordance with the present invention, the fluid can be treated either continuously or periodically, by passing through the multi-stage devices 20, 80 comprised of the vortices and bubbles' generating zones, as well as the higher-pressure working chambers. The systems can be placed any-where around a production site, oil refining column or any other facility. The device may be fixed in position or movable. Placement of one device may be combined with the placement of another device in series or parallel. In practice, it is necessary to consider the cost of the device, its production capacity and operation and maintenance expenses. It should be emphasized, that an operator of the cavitation device is not required to wear the high performance safety products for hearing protection, such as earmuffs or earplugs, as it would be in a case of a high frequency acoustic cavitation.

The implosion of the cavitation bubbles results in the formation of numerous micro bubbles. Both the pressure and the temperature of the vapor contained within these bubbles are significant. If the fluid, which is enriched with these bubbles, moves to a lower-pressure zone, the bubbles will play the role of nuclei and expand enhancing the cavitation field intensity (Zhang and Chai, 2001). The repeated multiplication, expansion and implosion of the cavities lower the cavitation threshold. The bubbles grow from the nuclei, whose volume is larger than that of the originally present nuclei. This intensifies processing and allows for the carrying out of selective chemical reactions. This makes the present device unique and especially suitable for treatment of multi-component viscous fluids such as petroleum, oils, melted animal fat, cell extracts and other feedstocks of a high economical value.

With sonic and ultrasonic radiation, the results are mixed, unless cavitation is uniform throughout the liquid. However, creating an even acoustic cavitation in large commercial tanks is a particular challenge. The present device achieves prompt alteration of fluids through using the multi-stage cavitation. The cavitation employed in accordance with the preferred embodiment of the present invention is achieved with a pump pressure selected from the range of approximately 50-5,000 psi. The optimal pressure produces a sufficient amount of cavities to achieve a high degree of treatment. However, as one familiar in the art can imagine, different fluids require different energies achieved through cavitation in order for their alteration to proceed. Therefore, the range of 50-5,000 psi is in no way limited for using the present invention. Energy released because of bubble implosion during a flow-through hydrodynamic cavitation activates molecules forcing them to react and form new compounds. The result is an upgraded product of higher commercial value whose components are easier to handle.

The oil purification from phosphorus catalyzed by lipid acyltransferase can be coincidental or conducted after the acid hydrolysis of ASGs and SGs to liberate steryl esters of fatty acids. The bubbles generated during such treatment are comprised of the vapors of the compounds that are volatile under the set conditions, including those to be removed during downstream purification steps. Energy released due to the implosion of cavitation bubbles disrupts the structure of water and oil mixing them thoroughly and significantly improving mass transfer, accelerating the target reactions. The ultrafine dispersions produced by using a flow-through cavitation apparatus are relatively stable and do not coalesce rapidly. They provide very large oil/water contact surface area which can be preserved through the subsequent conventional mechanical agitation. A hydrodynamic cavitation apparatus can be placed at the oil production site, storage facility or biodiesel plant. Yet another possibility exists, in which the apparatus is movable.

The size of the cavitatation bubbles depends on the fluidic mixture properties, design of the cavitation device, the flow velocity sustained by a pump, temperature and other conditions. In practice, the pump pressure is increased until the required level of cavitation is achieved. Inlet pressure affects the size, concentration and composition of the bubbles and, thus, the composition of the processed oil. Preferably the cavitation is optimized to efficiently purify oil by applying the most suitable pressure. The desirable outcome is obtained by generating hydrodynamic cavitation with an optimal cavitation number and density consistent throughout the flow.

The flow-through hydrodynamic apparatuses are designed for the express purification of large volumes of oil. The apparatuses can be placed sequentially or assembled in skid systems to scale up the capacity. The placement of one device may be combined with the placement of another one. The hydrodynamic cavitation-assisted treatment of oil can be repeated as many times as needed to achieve the desired result. The implosion of cavities results in the formation of deformed micro bubbles, which become nuclei after moving into the reduced pressure zone, enhancing the cavitation field density and lowering the cavitation threshold. This makes the multi-stage cavitation apparatus especially suitable for high-quality oil refining. The apparatuses can be easily mounted and transported, making them suitable for field and remote locations. In practice, it is necessary to consider a device's cost, its production capacity and the subsequent energy, maintenance and operation cost. An operator of a hydrodynamic cavitation apparatus is not required to wear hearing protection, as one would be in the case of an acoustic cavitation apparatus.

A practical approach to the best process outcome is to set an inlet pressure that provides enough bubble implosion energy for mixing oil and agent and transferring impurities to the water phase. The amount of agent solution added to the oil depends on the contamination level but is preferably relatively small. Oil and agent can be cavitated at the ambient temperature or can be preheated or cooled. Oil and agent is preferably cavitated at a pump pressure of 25-5,000 psi. The oil may also be subjected to cavitation in the absence of agent followed by cavitation-assisted purification in the presence of a suitable agent. One skilled in the art will understand that different oils require different conditions for conducting efficient purification and the 25-5,000 psi pump pressure does not limit the application of this invention.

The application of flow-through hydrodynamic cavitation is not limited to the removal of phosphorus, ASGs and SGs from oil to make it suitable for both human consumption and biodiesel production. FFA, metals, sulfur compounds, carbohydrates, liposaccharides, proteins, aldehydes, ketones, terpenes, carotenes, chlorophyll and other impurities can also be removed. If necessary, phosphoric acid, citric acid or other agents can be added to modify ASG and SG and facilitate their removal.

The objects of the present invention are achieved by feeding a mixture of liquid oil and agent solution in a flow-through hydrodynamic cavitation apparatus to carry out chemical and enzymatic reactions that favor refining. Hydrodynamic cavitation involves the formation of vapor bubbles in the oil-water flow accelerated with a pump. When the fluid pressure is reduced to the vapor pressure of water or other volatile compounds in the fluid, bubbles form that expand and then collapse in a downstream high-pressure region. The collapse produces sharp jumps in pressure and temperature, and shearing forces, resulting in improved mass transfer and higher reaction rates.

The following examples are given for illustrating the present invention and should not be construed as a limitation on either the scope or spirit of the invention.

Example 1

Ten liters of RBD palm oil containing 430 ppm ASG, 11 ppm SG and 0.045% FFA was mixed with 2.2% v/v of a 10% sodium hydroxide solution in water and subjected to a single-pass, flow-through hydrodynamic cavitation by using three 11-stage apparatuses placed in series and operated at an inlet pump pressure of 850 psi at a temperature of 90° C. The cavitated mixture was agitated for seven minutes, oil and water phases were separated via centrifugation and the oil phase was analyzed as described elsewhere. (Verleyena et al., 2002) The cavitation-refined oil contained 61 ppm ASG, 14 ppm SG and 0.045% FFA. ASG is likely to be removed partially as SG after the base-induced decomposition. No change in FFA level was observed. Therefore, it is concluded that palm oil can be efficiently refined via the express hydrodynamic cavitation method described, which provides oil suitable for the production of haze-free biodiesel.

Example 2

Ten liters of RBD palm oil containing 430 ppm ASG, 11 ppm SG and 0.045% FFA was mixed with 2.46% v/v of a 10% sodium hydroxide solution in water and subjected to the flow-through hydrodynamic cavitation by using three 11-stage apparatuses placed in series and operated at an inlet pump pressure of 850 psi at a temperature of 90° C. The cavitated mixture was agitated for seven minutes, oil and water phases were separated via centrifugation and the oil phase was analyzed as described elsewhere. (Verleyena et al., 2002) The cavitation-refined oil contained 17 ppm ASG, 6 ppm SG and 0.045% FFA. Thus, it is concluded that the express hydrodynamic cavitation method described achieves a significant reduction of both ASG and SG levels, providing an oil suitable for the production of haze-free biodiesel that meets ASTM requirements. It should be noted that no change in FFA level was observed similar to Example 1.

Example 3

To carry out conventional enzymatic degumming, 2.16 g of 30% citric acid solution was added to 1 kg crude soybean oil containing 650.00 ppm P, 46.40 ppm Ca, 64.70 ppm Mg and 0.80% FFA at 80-85° C. The mixture was subjected to high-shear forces and then gently agitated for fifteen minutes. Then 1.45 g of 14% NaOH solution per 1 kg oil was added and the mixture was vigorously mixed for one minute, cooled to 50-55° C. and 100 ppm phosphorylase A1 Lecitase Ultra in 2% water was introduced. After another agitation at 300-350 rpm and 50-55° C. for one hour the mixture was heated to 80-85° C. followed by centrifugation. The oil refined by this method of conventional enzymatic degumming contained 2.18 ppm P and 0.70% FFA. To carry out a comparable hydrodynamic cavitation-assisted enzymatic degumming with cavitated enzymes retaining full activity, 1.56% v/v water was added to soybean oil containing 650.00 ppm P, 46.40 ppm Ca, 64.70 ppm Mg and 0.80% FFA followed by the flow-through hydrodynamic cavitation treatment of this mixture by using three 11-stage apparatuses placed in series and operated at the inlet pump pressure of 800 psi. The mixture was matured at 80° C. for twenty minutes, cooled to 50-55° C. and 100 ppm phosphorylase A1 Lecitase Ultra in 1% v/v water was added followed by a second single-pass flow-through hydrodynamic cavitation treatment of the resultant mixture by using three 11-stage apparatuses placed in series and operated at an inlet pump pressure of 800 psi. The mixture was centrifuged after a fast mechanical agitation at 50-55° C. for one hour. The oil refined by this method of hydrodynamic cavitation-assisted enzymatic degumming contained 2.99 ppm P, 1.49 ppm Ca, 0.76 ppm Mg and 1.06% FFA confirming the higher efficiency of the combined treatment even with the citric acid and NaOH addition steps being omitted. The refined oil that was subjected to the cavitation after the addition of 100 ppm phospholipase contained 1.06% FFA, which is substantially higher when compared to 0.70% FFA obtained by conventional processing with 100 ppm enzyme. It should be noted that neither citric acid nor NaOH was used in the last treatment. The hydrodynamic cavitation not only significantly increases the oil yield but eliminates the need for using harsh chemicals. The invention provides a novel method for removing phospholipase- and LAT-hydrolyzable phosphatides from oil and increases the yield without making major changes to the conventional processing conditions.

Example 4

Crude soybean oil containing 650.00 ppm P, 46.40 ppm Ca, 64.70 ppm Mg and 0.80% FFA was heated to 80-85° C. and 1.56% v/v water was added followed by high-shear mixing for twenty minutes. The mixture was cooled to 50-55° C. and 100 ppm phosphorylase A1 Lecitase Ultra in 1% v/v water was introduced. After high-shear mixing for two minutes and gentle agitation for one hour the mixture was heated to 80-85° C. followed by centrifugation. The soybean oil refined by this method of enzymatic degumming in the absence of citric acid and NaOH contained 10.2 ppm P and 0.90% FFA. However, when 1.56% v/v water was added to the same crude soybean oil containing 650.00 ppm P, 46.40 ppm Ca, 64.70 ppm Mg and 0.80% FFA followed by flow-through hydrodynamic cavitation treatment of this mixture by using three 11-stage apparatuses placed in series and operated at the inlet pump pressure of 800 psi and high-shear mixing at 80° C. for twenty minutes, after which the mixture was cooled to 50-55° C. and 100 ppm phosphorylase A1 Lecitase Ultra in 1% v/v water was added and the mixture was vigorously agitated for one hour followed by centrifugation, the soybean oil refined by this hydrodynamic cavitation-assisted enzymatic degumming in the absence of citric acid and NaOH contained only 2.94 ppm P, 1.76 ppm Ca, 0.67 ppm Mg and 1.17% FFA. Thus, the hydrodynamic cavitation of oil and water prior to introducing phospholipase is highly beneficial, because it disrupts the structures of the water and oil allowing much larger oil/water interfacial area through generating ultrafine dispersions. Combining hydrodynamic cavitation of oil and water with the subsequent enzymatic degumming significantly lowers the reagent cost and conserves energy while providing the oil refined from phosphorus and metals and affords the higher yield. Indeed, FFA level increased from 0.80 to 1.17%, suggesting a significantly higher oil yield.

Example 5

To carry out the cavitation-assisted enzymatic degumming, a 50% citric acid solution was added to crude soybean oil to create a 0.03325% v/v percentage solution. The crude soy bean oil contained 650.00 ppm P, 46.40 ppm Ca, 64.70 ppm Mg and 0.80% FFA. This mixture was treated using the flow-through hydrodynamic cavitation process of the present invention by using three 11-stage apparatuses placed in series and operated at a pump pressure of 800 psi and gentle mixing at 80° C. for thirty minutes. The mixture was subjected to high-shear and then gently agitated for fifteen minutes. Then 1.56% v/v water was added and the mixture was cavitated again, kept at 80° C. for twenty minutes, cooled to 50-55° C. and 100 ppm phosphorylase A1 Lecitase Ultra in 1% v/v water was added. After agitation at 50-55° C. for one hour the mixture was centrifuged. The oil refined by this method contained 1.20 ppm P, 3.30 ppm Ca, 0.11 ppm Mg and 0.89%

FFA. When the above treatment was repeated with 50 ppm phosphorylase, the refined oil contained 0.81 ppm P, 0.18 ppm Ca, 0.07 ppm Mg and 0.83% FFA. Based on these data comparison, it can be concluded that hydrodynamic cavitation allows to significantly increase oil yield while cutting phospholipase use by at least 50%.

Example 6

For comparison purposes, cavitation-assisted degumming was carried out in the absence of enzymes using a 50% citric acid solution added to crude soybean oil to create a 0.03325% v/v percentage solution. The crude soybean oil contained 650.00 ppm P, 46.40 ppm Ca, 64.70 ppm Mg and 0.80% FFA. The mixture was gently agitated at 80° C. for 30 min followed by the addition of 1.56% v/v water. The mixture was subjected to a single-pass flow-through hydrodynamic cavitation treatment by using three 11-stage apparatuses that were placed in series and operated at an inlet pump pressure of 800 psi and centrifuged after maturation at 80° C. for twenty minutes. The oil refined by this method contained 3.15 ppm P, 0.38 ppm Ca, 0.26 ppm Mg and only 0.51% FFA.

In a similar experiment, a 50% citric acid solution was added to soybean oil to create a 0.03325% v/v percentage solution. The soybean oil contained 650.00 ppm P, 46.40 ppm Ca, 64.70 ppm Mg and 0.80% FFA and the mixture was subjected to a single-pass flow-through hydrodynamic cavitation treatment using three 11-stage apparatuses that were placed in series and operated at an inlet pump pressure of 800 psi followed by agitation at 80° C. for thirty minutes and the addition of 1.56% v/v water. Then the mixture was subjected again to a single-pass flow-through hydrodynamic cavitation treatment by using three 11-stage apparatuses placed in series and operated at an inlet pump pressure of 800 psi and centrifuged after maturation at 80° C. for twenty minutes. The oil refined by this method contained 6.80 ppm P, 0.73 ppm Ca, 0.56 ppm Mg and 0.53% FFA. Thus, no increase in yield was observed and the phosphorus concentrations were higher than those obtained with the cavitation and enzyme combined treatment.

The preferred embodiment the cavitation system that is especially suitable for the removal of ASGs and SGs from triacylglycerol oil using the process described herein is three 11-stage devices that are placed in series and operated at a pump pressure of 800-1,200 psi. In this preferred embodiment, the temperature of the oil and agent solution is in the range of 10-90° C. and the fluidic agent comprises a 0.1-5% v/v percentage solution.

The preferred embodiment of the cavitation system that is especially suitable for the enzymatic removal of phosphatides from triacylglycerol oil using the process described herein is three 11-stage devices that are placed in series and operated at an inlet pump pressure of 800-1,200 psi. In the preferred embodiment, the temperature of oil and enzyme solution is in the range of 40-60° C. and the enzyme containing water phase comprises 0.1-5% v/v percentage solution.

The purified oil and ASG- and/or SG-enriched residue or gums are separated via centrifugation at ambient temperature or at other temperatures, for instance at 10° C. Often, no neutralization is required prior to the transesterification of the oil purified from phytosterols via hydrodynamic cavitation. With the low amount of water added during the cavitation-assisted purification, the resultant moisture content of the purified oil is low and no drying is required.

Although the descriptions given above contain much specificity, this should not be construed as limiting the scope of the invention but as merely providing illustrations of some of the presently preferred embodiments of the present invention offering many potential uses. The localized heat released because of gas compression and micro jets that accompanies the bubble implosion mix the oil and water, thereby driving mass transfer, reactions and the modification and extraction of impurities, as well as other processes. Many other embodiments of the present invention are possible, which would be apparent to those skilled in the art. For example, there are many techniques for creating cavitation in fluidic mixture flows in addition to the ones described herein. Accordingly, the scope of the invention should be determined solely by the appended claims and their legal equivalents, rather than by the examples given.

The present invention uses energy released during the implosion of the cavitation bubbles to purify the oil. Hydrodynamic cavitation is the formation of vapor-filled bubbles in the flow of fluid followed by the collapse of these bubbles in a high-pressure zone. In practice, the process is performed as follows: the fluid is fed into the inlet passage cavitation apparatus with a pump. In localized zones, the flow velocity increases, causing the fluid pressure to drop in accordance with Bernoulli's law. This pressure drop leads to the formation of bubbles filled with the vapors of compounds that boil under the given conditions, i.e., the fluid pressure drops below the vapor pressure. When the pressure in the flow increases, the bubbles collapse, exposing the vapors found within them and the layer of the surrounding medium to the increased pressure and temperature, shearing forces, shock waves, acoustic vibration and electromagnetic irradiation. These factors result in alterations to the fluid components and reactions taking place within the collapsing bubbles or/and in the adjacent layers of fluid.

According to the present invention, the intensity of the cavitation field is controlled by using a properly designed device, inlet pressure, temperature and composition of the fluid medium. For example, the high viscosity of oil can be lowered by adding solvents or surfactants or mixtures thereof, by heating, applying external electric or magnetic fields or any combination thereof.

The present invention creates beneficial conditions that cannot be duplicated. The method efficiency can be further enhanced by the consecutive applications of high pressure, elevated heat, turbulence and vigorous mixing applied in a flow-through manner within a short period. The preferred embodiments of the present invention apply optimized levels of both pressure and heat via a controlled hydrodynamic cavitation. The process is independent of external conditions and provides a highly effective method of oil purification through the removal of phosphorus-containing compounds, ASG and SG.

Important economic benefits can be experienced through the implementation of this invention. The optimized usage of the flow-through hydrodynamic cavitation allows for a lowering of the equipment, handling and energy costs as it makes oil suitable for the production of ASTM-quality haze-free biodiesel. Cavitation-assisted purification presents no environmental threats and is economically feasible. The combination of the technological simplicity and the economical feasibility makes this method attractive to both the small and large biodiesel producers and oil refineries.

The detailed embodiments of the present invention are disclosed herein. However, it should be understood that the disclosed embodiments are merely exemplary of the invention, which may be embodied in various forms. Therefore, the details disclosed herein are not to be interpreted as limiting, but merely as the basis for the claims and teaching one skilled in the art how to use the invention. The beneficial effects gained through the present invention cannot be achieved through acoustic cavitation, in which bubbles attenuate the sound waves, limiting the effective distance of the sound wave generator. Furthermore, ultrasonic irradiation modifies a medium at specific locations, depending on the frequency and interference patterns. The present invention overcomes these limitations, purifying oil in uniform manner. While the preferred embodiments have been described, it will be understood that there is no intent to limit the invention by such disclosure, but rather it is intended to cover modifications falling within the spirit and scope of this invention. Various modifications may be made without departing from the scope and spirit of the invention. Accordingly, the invention is not to be limited, except as by the appended claims.

What is claimed is:

1. A process to remove impurities from triacylglycerol oil, comprising the steps of:
    mixing the oil and a fluidic agent to form a fluidic mixture having an oil phase and a water phase;
    pumping the fluidic mixture through a single- or multi-stage, flow-through hydrodynamic cavitation apparatus;
    creating hydrodynamic cavitation in the fluidic mixture by pumping the fluidic mixture at a pre-determined inlet pump pressure;
    maintaining the hydrodynamic cavitation in the fluidic mixture for a pre-determined period of time;
    moving the impurities from the oil phase to the water phase; and
    separating the water phase from the oil phase.

2. The process of claim 1, wherein the oil includes oil, fat, tallow or grease derived from a wild type, mutated or genetically altered unicellular or multicellular algae, plant, animal or mixture thereof.

3. The process of claim 1, wherein the oil is crude, refined, pressed, extracted, filtrated, or dewatered.

4. The process of claim 1, wherein the oil is liquefied prior to performing the mixing step.

5. The process of claim 1, wherein the oil comprises a multi-phase blend of immiscible liquids, solutes, acids, bases, salts, or gasses comprising a dispersion, an emulsion, a suspension, a melted solid, a gas in a supercritical condition or a mixture thereof.

6. The process of claim 1, wherein the flow-through hydrodynamic cavitation apparatus comprises a high-energy, jet collision hydrodynamic cavitation apparatus or a spinning, rotor-stator hydrodynamic cavitation apparatus.

7. The process of claim 1, wherein the fluidic mixture within at least one region inside the hydrodynamic cavitation apparatus has a cavitation number less than or equal to one when calculated using the equation: $C_v=(P-P_v)/0.5\rho V^2$, where $C_v$ is the cavitation number, P is the fluid pressure downstream of a constriction, $P_v$ is the vapor pressure of the fluidic mixture, $\rho$ is the density of the fluidic mixture, and V is the velocity of the fluidic mixture at the constriction.

8. The process of claim 1, wherein the separating step is performed by absorption, centrifugation, decantation, distillation, extraction, filtration, freezing, settling, sedimentation or combination thereof.

9. The process of claim 1, wherein the maintaining step further comprises the step of repeating the pumping and creating steps one or more times in one or more hydrodynamic cavitation apparatuses.

10. The process of claim 1, wherein the mixing step includes diluting the oil with an organic solvent.

11. The process of claim 1, further comprising the step of cavitating the oil prior to performing the mixing step.

12. The process of claim 1, wherein the fluidic mixture is heated or cooled prior to performing the pumping step.

13. The process of claim 1, further comprising the step of introducing ammonia gas, nitrogen, carbon dioxide or mixture thereof to the fluidic mixture before or during the pumping, creating and/or maintaining steps.

14. The process of claim 1, further comprising the step of immobilizing reagents, oxides, nitrides, ceramics, plastics, polytetrafluoroethylene, nanodiamonds, nanotubes, or combinations thereof onto inner walls of the hydrodynamic cavitation apparatus or onto a removable insert configured for insertion into the hydrodynamic cavitation apparatus.

15. The process of claim 1, further comprising the step of placing a selective membrane and/or bleaching earth in an end chamber of the hydrodynamic cavitation apparatus or in a chamber located downstream of the hydrodynamic cavitation apparatus.

16. The process of claim 1, wherein the oil is degassed prior to performing the pumping, creating and/or maintaining steps.

17. The process of claim 1, further comprising the step of subjecting the fluidic mixture to acoustic cavitation.

18. The process of claim 1, further comprising the step of subjecting the fluidic mixture to an external electric and/or magnetic field to enhance hydrodynamic cavitation-assisted purification.

19. The process of claim 1, wherein the impurities comprise phytosterols, sterol glucosides and/or acylated sterol glucosides.

20. The process of claim 19, wherein the fluidic agent is water comprising 0.1-10% v/v of the fluidic mixture.

21. The process of claim 20, wherein the water is distilled, de-ionized, reverse osmosis-purified, soft water or conditioned water.

22. The process of claim 19, wherein the fluidic agent is a solution of an alkali hydroxide comprising sodium hydroxide or potassium hydroxide, an inorganic base, an organic base or a mixture thereof.

23. The process of claim 19, wherein the fluidic agent is a solution of phosphoric acid, citric acid, acetic acid or a mixture thereof.

24. The process of claim 19, wherein the separating step, as it relates to phytosterol impurities, is carried out contemporaneously with the maintaining step.

25. The process of claim 19, wherein the separating step, as it relates to sterol glucosides, acylated sterol glucosides and/or derivative-enriched concentrates of the same, further comprises the steps of:
    liquefying the separated sterol glucosides, acylated sterol glucosides and/or derivative-enriched concentrates thereof by preheating and/or treating the same with solvents and/or liquefying agents;
    adding enzymes or chemical agents to the liquefied sterol glucosides, acylated sterol glucosides and/or derivative-enriched concentrates thereof;
    subjecting the liquefied sterol glucosides, acylated sterol glucosides and/or derivative-enriched concentrates thereof combined with enzymes or chemical agents to flow-through hydrodynamic cavitation; and
    releasing entrapped oil in the liquefied sterol glucosides, acylated sterol glucosides and/or derivative-enriched concentrates thereof.

26. The process of claim 1, wherein the impurities comprise phosphatides and the fluidic agent comprises water and an enzyme.

27. The process of claim 26, wherein the fluidic mixture is heated or cooled to a temperature in the range of 40-60° C. for optimal enzyme activity.

28. The process of claim 26, wherein the enzyme comprises a phospholipase, a lipid acyltransferase or a mixture thereof.

29. The process of claim 28, wherein the phospholipase is a wild type, mutated or recombinant bacterial, yeast, plant or animal phospholipase A, phospholipase A1, phospholipase A2, phospholipase B, lysophospholipase, phospholipase C, phospholipase D, phosphodiesterase, lipid acyltransferase, phosphodiesterase or mixture thereof.

30. The process of claim 29, wherein the oil is mixed with water and the mixture is subjected to hydrodynamic cavitation followed by the addition of the phospholipase, lipid acyltransferase or mixture thereof.

31. The process of claim 26, further comprising the steps of:
    reacting the phosphatides in the fluidic mixture with the enzyme;
    agitating the fluidic mixture for a pre-determined period of time to allow completion of the phosphatide reaction; and
    stopping the phosphatide reaction.

32. The process of claim 31, wherein phosphatide reaction is stopped by heating; changing the pH; applying an inhibitor, protease or chelating agent that forms a complex with the enzyme's co-factor; carrying out high-shear mixing; ultrasonic cavitation; and/or subjecting to hydrodynamic cavitation.

33. The process of claim 31, wherein the separating step comprises the step of removing the reacted phosphatides.

34. The process of claim 33, wherein the reacted phosphatides are removed by absorption, centrifugation, decantation, extraction, filtration, freezing, membrane filtration, or sedimentation.

35. The process of claim 33, wherein the separating step, as it relates to the removed phosphatides, further comprises the steps of:
    liquefying the removed phosphatides by preheating the removed phosphatides, and/or adding solvents and liquefying agents to the removed phosphatides;
    subjecting the liquefied phosphatides to flow-through hydrodynamic cavitation; and
    releasing entrapped neutral oils and liberating diacylglycerols and fatty acids in the liquefied phosphatides.

36. The process of claim 33, wherein the separating step, as it relates to the removed phosphatides, further comprises the steps of:
    liquefying the removed phosphatides by preheating the removed phosphatides, and/or adding solvents and liquefying agents to the removed phosphatides;
    adding releasing agents and/or lipid acyltransferase, lipase, phospholipase or a mixture thereof to the liquefied phosphatides; and
    releasing entrapped oils in the liquefied phosphatides.

37. The process of claim 26, further comprising the step of immobilizing the enzyme onto a removable cartridge, grid, filter, insert, inner surface, magnet, magnetic particles, metal particles, plastic particles, nanoparticles, nanotubes, nanodiamonds, carbonaceous nanoparticles, particles and/or carriers placed at desired locations within the hydrodynamic cavitation apparatus.

* * * * *